Patented June 3, 1930

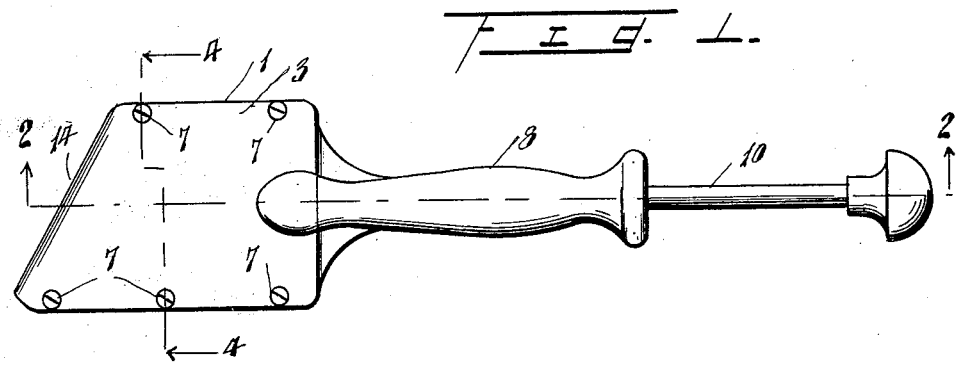
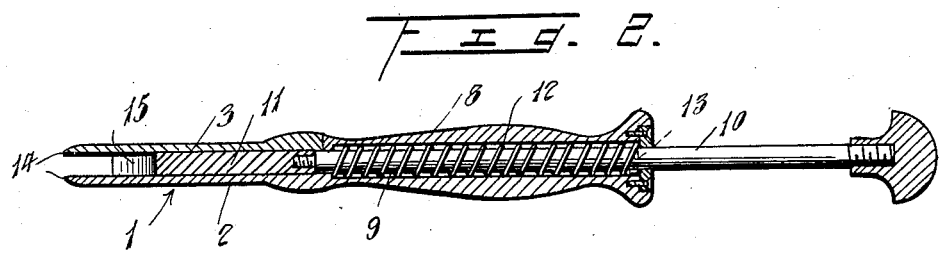
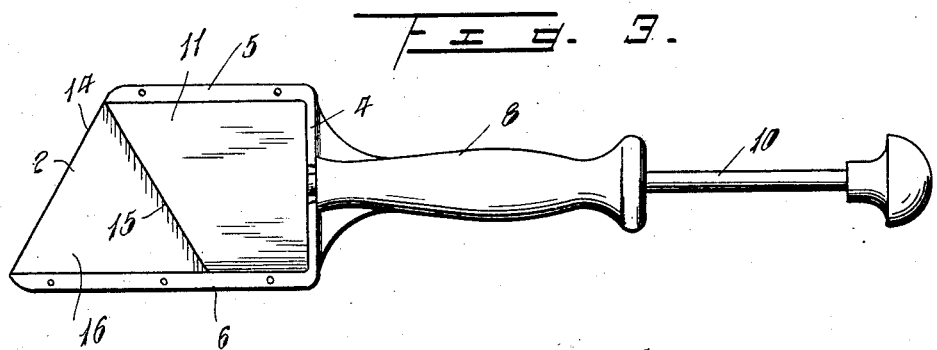
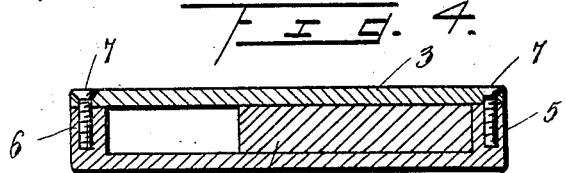

1,761,986

UNITED STATES PATENT OFFICE

JOSEPH H. GRUMMER, OF CLEVELAND, OHIO, ASSIGNOR OF ONE-HALF TO RODERICK W. McPHERSON, OF CLEVELAND, OHIO

ICE-CREAM DIPPER

Application filed December 19, 1929. Serial No. 415,315.

The invention relates to dippers for serving ice cream and has for its principal object the provision of means by which ice cream is molded into a flat triangular shape to serve on a piece of pie, and means are provided by which the ice cream is molded and the molded ice cream discharged from the mold onto the slice of pie.

A further object of the invention is the provision of an ice cream dipper including a hollow member having spaced flat sides and the open end of the member inclined at an angle to the adjacent side of the member, and providing a slidable plunger within the member adapted for manual operation, said plunger having its outer face inclined at an angle opposite to the angle of the outer end of the hollow member to form a triangular mold within the hollow member in which the ice cream is molded and discharged by operation of the plunger.

The invention will be described in detail hereinafter and will be found illustrated in the accompanying drawings in which—

Figure 1 is a side view in elevation of the improved ice cream dipper;

Figure 2 is a longitudinal sectional view on a plane indicated by the line 2—2 of Figure 1;

Figure 3 is a view similar to Figure 1 showing the removable plate removed disclosing the interior of the hollow member, and Figure 4 is a transverse sectional view on a plane indicated by the line 4—4 of Figure 1.

In the drawings similar reference characters are used to designate corresponding parts throughout the several views.

The improved ice cream dipper comprises a hollow member 1 consisting of spaced plates 2 and 3, the plate 2 having integral lateral flanges 4, 5 and 6 spacing the plates 2 and 3 from one another, and the plate 3 is secured to the flanges 5 and 6 by means of screws or other suitable fastening members 7. 8 is a handle formed integral with the plate 2 and provided with an extension of the flange 4 and having an opening 9 therein through which is extended a rod 10 secured to a plunger 11 slidably mounted within the hollow member 1. 12 indicates an expansible coil spring enclosing the rod 10 within the tubular handle 8 and terminally engaging the handle and the rod 10 and serving to normally hold the plunger 11 within the hollow member 1 as shown in Figure 3. The rod 10 is provided with a transverse opening 13 to receive the end of the spring 12 to secure it thereto. The side of the hollow member 1 opposite to the flange 4 is open and the edges of the plates 2 and 3 are inclined at an angle to the adjacent sides of the hollow member as shown at 14, while the outer edge of the plunger 11 is inclined as shown at 15 at an angle opposite to the inclination of the outer edges of the sides 2 and 3 as shown at 14, thus providing a triangular mold 16 in the hollow member 1 to receive and mold ice cream or other product to be discharged from the hollow member 1 by operation of the plunger 11. The molded ice cream or other product will be in the shape of a flat triangular block, and as heretofore stated the device is particularly adapted to molding ice cream for garnishing slices of pie.

The removable plate 3 provides means by which the device may be dismembered for cleaning the interior of the hollow member 1 and the plunger 11.

What is claimed is:—

1. An ice cream dipper, comprising a hollow member having its open end inclined, a tubular handle secured to said member and communicating with the hollow space therein, a plunger slidably mounted in said hollow member, a rod secured to said plunger and extending through said tubular handle, the outer edge of the plunger being inclined oppositely to the inclination of the open end of the hollow member and providing a mold for ice cream, the molded ice cream being discharged by actuating the plunger outwardly of said member.

2. An ice cream dipper, comprising a hollow member having its space narrow in one dimension and relatively wider transversely of the member, a tubular handle on said member and communicating with said space, the edge of said member opposite to said handle being inclined from one narrow wall to the other, a plunger slidably mounted and snugly fitting in said member, a rod secured to said plunger and extending through said tubular handle, and the edge of said plunger opposite to said rod inclined inwardly of the hollow member and opposite to the inclination of the edge of the member, the space formed within the member by said oppositely inclined edges providing a mold for containing ice cream for discharge by the action of the plunger.

3. An ice cream dipper, comprising a hollow member consisting of two spaced plates, one of said plates having flanges on some of its edges spacing the plates, means securing the other plate to the flanges, a tubular handle extending from said flanged plate, the bore of the handle communicating with the interior of the member through a flange on the plate, the side of said member opposite to said handle being open and the plate edge inclined, a plunger slidably mounted in said member, a rod secured to the plunger and slidably mounted in the tubular handle, spring means in said tubular handle and engaging said rod to normally withdraw the plunger within the member, and the outer edge of the plunger inclined at an angle opposite to the inclination of the edges of the plates aforesaid, and providing a triangular space within the member to receive and mold a block of ice cream.

In testimony whereof I affix my signature.

JOSEPH H. GRUMMER.